United States Patent [19]
Wheatley, III

[11] Patent Number: 5,267,262
[45] Date of Patent: Nov. 30, 1993

[54] TRANSMITTER POWER CONTROL SYSTEM

[75] Inventor: Charles E. Wheatley, III, Del Mar, Calif.

[73] Assignee: Qualcomm Incorporated, San Diego, Calif.

[21] Appl. No.: 773,067

[22] Filed: Oct. 8, 1991

Related U.S. Application Data

[63] Continuation-in-part of Ser. No. 433,031, Nov. 7, 1989, Pat. No. 5,056,109.

[51] Int. Cl.$^5$ .................. H04L 27/30; H04J 13/00; H04B 7/204
[52] U.S. Cl. .................................. 375/1; 370/18; 379/59; 455/33.1; 455/38.3; 455/54.1; 455/69; 380/34
[58] Field of Search .......... 455/33.1, 54.1, 59, 455/69, 73, 226.1-226.3, 38.3; 379/58-60, 63; 375/1; 380/34; 370/18

[56] References Cited

U.S. PATENT DOCUMENTS

| | | | |
|---|---|---|---|
| 3,925,782 | 12/1975 | Anderl et al. | 455/53.1 |
| 4,112,257 | 9/1978 | Frost | 379/60 |
| 4,123,718 | 10/1978 | Lampert et al. | 375/1 |
| 4,193,031 | 3/1980 | Cooper | 455/38.1 |
| 4,222,115 | 9/1980 | Cooper et al. | 375/1 |
| 4,225,976 | 9/1980 | Osborne et al. | 375/1 X |
| 4,495,648 | 1/1985 | Giger | 455/73 |
| 4,580,262 | 4/1986 | Naylor et al. | 455/69 X |
| 4,613,990 | 9/1986 | Halpern | 455/33.2 |
| 4,641,322 | 2/1987 | Hasegawa | 375/1 |
| 4,672,658 | 6/1987 | Kavehrad et al. | 375/1 X |
| 4,765,753 | 8/1988 | Schmidt | 379/60 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67.1 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,107,487 | 4/1992 | Vilmur et al. | 370/18 |

Primary Examiner—Bernarr E. Gregory
Attorney, Agent, or Firm—Russell B. Miller

[57] ABSTRACT

A power control system for a cellular mobile telephone system in which system users communicate information signals between one another via at least one cell site using code division multiple access spread spectrum communication signals. The power control system controls transmission signal power for each cellular mobile telephone in the cellular mobile telephone system wherein each cellular mobile telephone has an antenna, transmitter and receiver and each cell-site also has an antenna, transmitter and receiver. Cell-site transmitted signal power is measured as received at the mobile unit. Transmitter power is adjusted at the mobile unit in an opposite manner with respect to increases and decreases in received signal power. A power control feedback scheme may also be utilized. At the cell-site communicating with the mobile unit, the mobile unit transmitted power is measured as received at the cell-site. A command signal is generated at the cell-site and transmitted to the mobile unit for further adjusting mobile unit transmitter power corresponding to deviations in the cell site received signal power. The feedback scheme is used to further adjust the mobile unit transmitter power so that mobile unit transmitted signals arrive at the cell-site at a desired power level.

19 Claims, 7 Drawing Sheets

TRANSMITTER POWER CONTROL SYSTEM

BACKGROUND OF THE INVENTION

I. Field of the Invention

The present application is a continuation-in-part application of copending U.S. patent application Ser. No. 07/433,031, filed Nov. 7, 1989, also entitled "METHOD AND APPARATUS FOR CONTROLLING TRANSMISSION POWER IN A CDMA CELLULAR TELEPHONE SYSTEM" now U.S. Pat. No. 5,056,109 issued Oct. 8, 1991, and as such also relates telephone systems. More specifically, the present invention relates to a novel and improved method and apparatus for controlling transmitter power in a code division multiple access (CDMA) cellular mobile telephone system.

II. Description of the Related Art

The use of code division multiple access (CDMA) modulation techniques is one of several techniques for facilitating communications in which a large number of system users are present. Although other techniques such as time division multiple access (TDMA) frequency division multiple access (FDMA) and AM modulation schemes such as amplitude companded single sideband (ACSSB) are known, CDMA has significant advantages over these other techniques. The use of CDMA techniques in a multiple access communication system is disclosed in U.S. patent application Ser. No. 06/921,261, filed Oct. 17, 1986, entitled "SPREAD SPECTRUM MULTIPLE ACCESS COMMUNICATION SYSTEM USING SATELLITE OR TERRESTRIAL REPEATERS", now U.S. Pat. No. 4,901,307 assigned to the assignee of the present invention, the disclosure thereof incorporated by reference.

In the just mentioned patent, a multiple access technique is disclosed where a large number of mobile telephone system users each having a transceiver communicate through satellite repeaters or terrestrial base stations (also known as cell-sites stations, or for short cell-sites) using code division multiple access (CDMA) spread spectrum communication signals. In using CDMA communications, the frequency spectrum can be reused multiple times thus permitting an increase in system user capacity. The use of CDMA results in a much higher spectral efficiency than can be achieved using other multiple access techniques. In a CDMA system, increases in system capacity may be realized by controlling the transmitter power of each mobile user so as to reduce interference to other system users.

In the satellite application of the CDMA communication techniques, the mobile unit transceiver measures the power level of a signal received via a satellite repeater. Using this power measurement, along with knowledge of the satellite transponder downlink transmit power level and the sensitivity of the mobile unit receiver, the mobile unit transceiver can estimate the path loss of the channel between the mobile unit and the satellite. The mobile unit transceiver then determines the appropriate transmitter power to be used for signal transmissions between the mobile unit and the satellite, taking into account the path loss measurement, the transmitted data rate and the satellite receiver sensitivity.

The signals transmitted by the mobile unit to the satellite are relayed by the satellite to a Hub control system earth station. The Hub measures the received signal power from signals transmitted by each active mobile unit transceiver. The Hub then determines the deviation in the received power level from that which is necessary to maintain the desired communications. Preferably the desired power level is a minimum power level necessary to maintain quality communications so as to result in a reduction in system interference.

The Hub then transmits a power control command signal to each mobile user so as to adjust or "fine tune" the transmit power of the mobile unit. This command signal is used by the mobile unit to change the transmit power level closer to a minimum level required to maintain the desired communications. As channel conditions change, typically due to motion of the mobile unit, both the mobile unit receiver power measurement and the power control feedback from the Hub continually readjust the transmit power level so as to maintain a proper power level. The power control feedback from the Hub is generally quite slow due to round trip delays through the satellite requiring approximately ½ of a second of propagation time.

One important difference between satellite or terrestrial base stations systems are the relative distances separating the mobile units and the satellite or cell-site. Another important different in the satellite versus the terrestrial system is the type of fading that occurs in these channels. Thus, these differences require various refinements in the approach to system power control for the terrestrial system.

In the satellite/mobile unit channel, i.e. the satellite channel, the satellite repeaters are normally located in a geosynchronous earth orbit. As such, the mobile units are all at approximately the same distance from the satellite repeaters and therefore experience nearly the same propagation loss. Furthermore, the satellite channel has a propagation loss characteristic that follows approximately the inverse square law, i.e. the propagation loss is inversely proportional to the square of the distance between the mobile unit and the satellite repeater in use. Accordingly, in the satellite channel the variation in path loss due to distance variation is typically on the order of only 1-2 dB.

In contrast to the satellite channel, the terrestrial/mobile unit channel, i.e. the terrestrial channel, the distance between the mobile units and the cell sites can vary considerably. For example, one mobile unit may be located at a distance of five miles from the cell site while another mobile unit may be located only a few feet away. The variation in distance may exceed a factor of one hundred to one. The terrestrial channel experiences a propagation loss characteristic as did the satellite channel. However, in the terrestrial channel the propagation loss characteristic corresponds to an inverse fourth-power law, i.e. the path loss is proportional to the inverse of the path distance raised to the fourth power. Accordingly, path loss variations may be encountered which are on the order of over 80 dB in a cell having a radius of five miles.

The satellite channel typically experiences fading that is characterized as Rician. Accordingly the received signal consists of a direct component summed with a multiply reflected component having Rayleigh fading statistics. The power ratio between the direct and reflected component is typically on the order of 6-10 dB, depending upon the characteristics of the mobile unit antenna and the environment about the mobile unit.

Contrasting the satellite channel with the terrestrial channel, the terrestrial channel experiences signal fading that typically consists of the Rayleigh faded component without a direct component. Thus, the terrestrial channel presents a more severe fading environment than the satellite channel where Rician fading is the dominant fading characteristic.

The Rayleigh fading characteristics in the terrestrial channel signal is caused by the signal being reflected from many different features of the physical environment. As a result, a signal arrives almost simultaneously at a mobile unit receiver from many directions with different transmission delays. At the UHF frequency bands usually employed for mobile radio communications, including those of cellular mobile telephone systems, significant phase differences in signals traveling on different paths may occur. The possibility for destructive summation of the signals may result, with on occasion deep fades occurring.

Terrestrial channel fading is a very strong function of the physical position of the mobile unit. A small change in position of the mobile unit changes the physical delays of all the signal propagation paths, which further results in a different phase for each path. Thus, the motion of the mobile unit through the environment can result in a quite rapid fading process. For Example, in the 850 MHz cellular radio frequency band, this fading can typically be fast as one fade per second per mile per hour of vehicle speed. Fading on this order can be extremely disruptive to signals in the terrestrial channel resulting in poor communication quality. However, additional transmitter power can be used to overcome the problem of fading.

The terrestrial cellular mobile telephone system typically requires a full-duplex channel to be provided in order to allow both directions of the telephone conversation to be simultaneously active such as provided by the conventional wired telephone system. This full-duplex radio channel is normally provided by using one frequency band for the outbound link, i.e. transmissions from the cell-site transmitter to the mobile unit receivers. A different frequency band is utilized for the inbound link, i.e. transmission from the mobile unit transmitters to the cell-site receivers. According, this frequency band separation allows a mobile unit transmitter and receiver to be active simultaneously without feedback or interference from the transmitter into the receiver.

The use of different frequency bands has significant implications in the power control of the cell-site and mobile unit transmitters. Use of different frequency bands causes the multipath fading to be independent processes for the inbound and outbound channels. A mobile unit cannot simply measure the outbound channel path loss and assume that the same path loss is present on the inbound channel.

Furthermore, in the terrestrial cellular mobile telephone the mobile phone is capable of communications through multiple cell-sites as disclosed in copending U.S. patent application Ser. No. 07/433,030, filed Nov. 7, 1989 entitled "METHOD AND SYSTEM FOR PROVIDING A SOFT HANDOFF IN COMMUNICATIONS IN A CDMA CELLULAR TELEPHONE SYSTEM" now U.S. Pat. No. 5,101,501 issued Mar. 31, 1992, assigned to the assignee of the present invention and the disclosure of which is incorporated by reference. In communications with multiple cell-sites the mobile unit and cell-sites include a multiple receiver scheme as disclosed in the just mentioned application and further detailed in copending U.S. patent application Ser. No. 07/432,552, also filed Nov. 7, 1989 and entitled "DIVERSITY RECEIVER IN A CDMA CELLULAR TELEPHONE SYSTEM" now U.S. Pat. No. 5,109,390 issued Apr. 28, 1992, assigned to the assignee of the present invention and the disclosure of which is also incorporated by reference.

In the cell diversity environment in which the mobile phone is communicating with another user through multiple cell-sites, mobile phone transmitter power must also be controlled so as to avoid adverse interference with other communications in all cells.

It is therefore, an object of the present invention to provide a novel and improved method and apparatus for controlling transmitter power in the terrestrial channel in a cell diversity environment so as to overcome deleterious fading without causing unnecessary system interference which can adversely affect overall system capacity.

SUMMARY OF THE INVENTION

In a terrestrial CDMA cellular mobile telephone system, it is desirable that the transmitter power of the mobile units be controlled so as to produce at the cell site receiver a nominal received signal power from each and every mobile unit transmitter operating within the cell. Should all of the mobile unit transmitters within an area of coverage of the cell-site have transmitter power controlled accordingly the total signal power received at the cell-site would be equal to the nominal receiver power of the mobile unit transmitted signal multiplied by the number of mobile units transmitting within the cell. To this is added the noise power received at the cell-site from the mobile units adjacent cells.

The CDMA receivers of the cell-site respectively operate by converting a wideband CDMA signal from a corresponding one of the mobile unit transmitters into a narrowband digital information carrying signal. At the same time, other received CDMA signals that are not selected remain as wideband noise signals. The bit-error-rate performance of the cell-site receiver is thus determined by the ratio of the power of the desired signal to that of the undesired signals received at the cell-site, i.e., the received signal power in the desired signal transmitted by the selected mobile unit transmitter to that of the received signal power in undesired signals transmitted by the other mobile unit transmitters. The bandwidth reduction processing, a correlation process which results in what is commonly called "processing gain", increases the signal to noise interference ratio from a negative value to a positive value thus allowing operation within an acceptable bit-error-rate.

In a terrestrial CDMA cellular mobile telephone system it is extremely desirable to maximize the capacity in terms of the number of simultaneous telephone calls that may be handled in a given system bandwidth. System capacity can be maximized if the transmitter power of each mobile unit is controlled such that the transmitted signal arrives at the cell-site receive at the minimal signal to noise interference ratio which allows acceptable data recovery. If a signal transmitted by a mobile unit arrives at the cell-site receiver at a power level that is too low, the bit-error-rate may be too high to permit high quality communications. On the other hand if the mobile unit transmitted signal is at a power level that is too high when received at the cell-site receiver, communication with this particular mobile unit will be acceptable: However, this high power signal acts as interference to other mobile unit transmitted signals that are sharing the same channel, i.e. bandwidth. This interference may adversely affect communications with other mobile units unless the total number of communicating mobile units is reduced.

The path loss of signals in the UHF frequency band of the cellular mobile telephone channel can be characterized by two separate phenomena, average path loss and fading. The average path loss can be described statistically by a log-normal distribution whose mean is proportional to the inverse fourth-power of the path distance, and whose standard deviation is approximately equal to 8 dB. The second phenomena is a fading process caused by multipath propagation of the signals which is characterized by a Rayleigh distribution. The average path loss, which is a log-normal distribution, can be considered to be the same for both the inbound and outbound frequency bands, as is for the conventional cellular mobile telephone systems. However, as mentioned previously Rayleigh fading is an independent phenomena for the inbound and outbound link frequency bands. The log-normal distribution of the average path loss is a relatively slow varying function of position. In contrast, the Rayleigh distribution varies relatively fast as a function of position.

In the terrestrial environment where multipath signal propagation is common a signal transmitted by a transmitter may travel several different paths to a receiver. Each version of the same signal as travelling upon a different propagation path may experience Rayleigh and/or Rician fading. However the total received power of the signal as measured at the receiver does not fade much.

As disclosed herein, a CMDA approch to multiple user access in a cellular mobile telephone system is implemented. In such a system all the cell-sites in a region transmit a "pilot" signal of the same frequency and code. The use of a pilot signal in CDMA systems is well known. In this particular application, the pilot signal is used by the mobile units for initial synchronization of the mobile unit receiver. The pilot signal is also used as a phase and frequency reference, and a time reference for demodulation of the digital speech signals transmitted by the cell-site.

Each mobile unit estimates the path loss in signals transmitted from the cell-site to the mobile unit. In order to make this signal path loss estimate, the combined power of all cell-site transmitted signals as received at the mobile unit is measured. This power level sum measurement is used for purposes of instantaneous open loop power control. This power level sum measurement control is particularly applicable to the situation where the mobile unit might temporarily obtain a better path to a more distant cell-site than to a normally preferred closest cell-site. In this situation the power level sum is used to reduce the mobile unit transmitter power to prevent unnecessary interference to the other users. The mobile unit also measures the pilot signal power as received from the cell-site to which the mobile unit is communicating for assigning data receivers. The mobile unit also measures the signal power of communication signals intended for the mobile unit as transmitted from the cell-site to which the mobile unit is in communication with for purposes of generating a request for an increase in the cell-site transmission power.

The outbound link path loss estimate at the mobile unit is used by the mobile unit to adjust the mobile unit transmitter power. Thus, the stronger the received signal, the lower the mobile unit transmitter power will be. Reception of a strong signal from the cell-site indicates that the mobile unit is either close to the cell-site or else an unusually good path to the cell-site exists. Reception of a strong signal means that a relatively smaller mobile unit transmitter power level is required in nominal received power at the cell-site the mobile unit.

In the case of a sudden degradation in the channel, a sudden decrease in signal power in signals received at the mobile unit is experienced. Although the mobile unit transmitter power increases in response to this channel condition, the power increase is controlled from being increased at an excessively high rate through a closed loop power control scheme. The rate of increase of the mobile unit transmitter transmit power is within a rate of control, e.g. 0.5 dB per 1.25 milliseconds, provided through closed loop power adjustment commands transmitted from the cell-site, as described below. Using the cell-site generated power adjustment commands, the mobile unit transmitter power will be prevented from being increased to a level significantly higher than the level required for communications, particularly when a sudden channel degradation occurs in only the outbound link path and not in the inbound link path.

In addition to measuring the received signal strength in the mobile unit, it is also desirable for the processor in the mobile unit to know the cell-site transmitter power and antenna gain (EIRP), the cell-site G/T (receive antenna gain G divided by receiver noise level T) the mobile unit antenna gain, and the number of calls active at this cell-site. This information allows the mobile unit processor to properly compute the reference power level for the local power setting function. This computation is done by calculating the cell-site to mobile link power budget, solving for the path loss. This path loss estimate is then used in the mobile cell-site link budget equation, solving for the mobile unit transmit power required to produce a desired signal level. This capability allows the system to have cell-sites with differing EIRP levels to correspond to the size of the cells. For example, a small radius cell need not transmit with as high a power level as a large radius cell. However, when the mobile unit is a certain distance from a low power cell, it would receive a weaker signal than from a high power cell. The mobile unit would respond with a higher transmit power than would be necessary for the short range. Hence, the desirability of having each cell-site transmit information as to its characteristics for power control.

The cell-site transmits information such as cell-site EIRP, G/T and number of active calls on a cell-site setup channel. The mobile unit receives this information when first obtaining system synchronization and continues to monitor this channel when idle for pages for calls originated within the public telephone switching network intended for the mobile unit. The mobile unit antenna gain is stored in a memory in the mobile unit at the time the mobile unit is installed in the vehicle.

In a simplified approach, the cell-site may merely compute a simple parameter based upon the above cell-site information from which a mobile unit transmitter power level may be derived. This parameter is transmitted to the mobile unit where used to determine the transmitter power level. In determining the transmitter power level at the mobile unit a basic rule may be applied, such as the sum of the measured total received signal power and the transmit power equal a constant. This constant however is subject to change depending upon changes in the cell-site transmission power level as discussed later herein.

As mentioned previously, mobile unit transmitter power is also controlled by a signal from one or more cell-sites. Each cell-site receiver measures the strength of the signal, as received at the cell-site, from each mobile unit to which the cell-site is in communication with. The measured signal strength is compared to a desired signal strength level for that particular mobile unit. A power adjustment command is generated and sent to the mobile unit. In response to the cell-site power adjustment command, the mobile unit increases or decreases the mobile unit transmitter power by a predetermined amount, nominally less than 1 dB. In the cell diversity sitaution, power adjustment commands are provided from both cell sites. The mobile unit acts upon these multiple cell-site provided power control commands, so as to avoid mobile unit transmitter power levels that may adversely interfere with other mobile unit communications with the cell-sites, and yet provide sufficient power to support communications between the mobile unit and at least one cell-site.

The power adjustment command is transmitted by the cell-site transmitter at a relatively high rate, typically on the order of about one command every millisecond. The rate of transmission of the power adjustment command must be high enough to permit Rayleigh fading on the inbound link path to be tracked. It is further desirable for the outbound link path Rayleigh fading impressed on the inbound link path signal to be tracked. One command per 1.25 millisecond is adequate to track the fading processes for vehicle speeds in the range of 25-50 miles per hour for 850 MHz band mobile communications. It is important that the latency in determining the power adjustment command and the transmission thereof be minimized so that channel conditions will not change significantly before the mobile unit receives and responds to the signal.

In summary, to account for the independence of the two Rayleigh fading paths (inbound and outbound), the mobile unit transmitter power is controlled by the power adjustment command from the cell-site. Each cell-site receiver measures the received signal strength from each mobile unit. The measured signal strength is compared to the desired signal strength for that mobile unit and a power adjustment command is generated. The power adjustment command is sent to the mobile unit in the outbound data or voice channel addressed to that mobile unit. This power adjustment command is combined with the mobile unit one way estimate to obtain the final value of the mobile unit transmitter power.

The power adjustment command signal is transmitted, in an exemplary embodiment, by overwriting one or more user data bits every millisecond. The modulation system employed in CDMA systems is capable of providing correction coding for user data bits. The overwrite by the power adjustment command is treated as a channel bit error or erasure and corrected by the error correction as decoded in the mobile unit receiver. Error correction coding on the power adjustment command bits in many cases may not be desirable because of the resulting increased latency in reception and response to the power adjustment command. It is also envisioned that time division multiplexing for transmission of the power adjustment command bits may be used without overwriting user data channel symbols.

The cell-site controller or processor can be used to determine the desired signal strength, as received at the cell-site, for signals transmitted by each mobile unit. The desired signal strength level values are provided to each of the cell-site receivers. The desired signal strength value is used for comparing with a measured signal strength value for generating the power adjustment command.

A system controller is utilized to command each cell-site processor as to the value of desired signal strength to use. The nominal power level can be adjusted up or down to accommodate variations in the average conditions of the cell. For example, a cell-site positioned in an unusually noisy location or geographic region might be allowed to use a higher than normal inbound power level. However, such a higher power level for in-cell operation will result in higher levels of interference to immediate neighbors of this cell. This interference can be compensated for by allowing the neighbor cells a small increase in inbound link power. Such an increase in inbound power in neighboring cells would be smaller than that of the increase given to the mobile users communicating in the high noise environment cell. It is further understood that the cell-site processor may monitor the average bit-error-rate. This data may be used by the system controller to command the cell-site processor to set an appropriate inbound link power level to assure acceptable quality communications.

It is also desirable to provide a means for controlling the relative power used in each data signal transmitted by the cell-site in response to control information transmitted by each mobile unit. The primary reason for providing such control is to accommodate the fact that in certain locations, the outbound channel link from the cell-site to the mobile unit may be unusually disadvantaged. Unless the power being transmitted to this mobile is increased, the quality may become unacceptable. An example of such a location is a point where the path loss to one or two neighboring cells is nearly the same as the path loss to the cell-site communicating with the mobile unit. In such a location, the total interference would be increased by three times over the interference seen by the mobile unit at a point relatively close to its cell-site. In addition, the interference coming from these neighboring cell-sites will not fade in unison with the desired signal as would be the case for interference coming from the desired cell-site. This situation may required 3-4 dB additional signal power to achieve adequate performance.

In another situation, the mobile unit may be located where several strong multipath signals arrive, resulting in larger than normal interference. In such a situation, increasing the power of the desired signal relative to the interference may allow acceptable performance. At other times, the mobile unit may be located where the signal-to-interference ratio is unusually good. In such a case, the cell-site could transmit the desired signal using a lower than normal transmitter power, reducing interference to other signals being transmitted by the system.

To achieve the above objectives, the preferred embodiment includes a signal-to-interference measurement capability within the mobile unit receiver. This measurement is performed by comparing the power of the desired signal to the total interference and noise power. If the measured ratio is less than a predetermined value, the mobile transmits a request to the cell-site for additional power in cell-site transmissions. If the ratio exceeds the predetermined value the mobile unit transmits a request for a reduction in power.

The cell-site receives the power adjustment request from each mobile and responds by adjusting the power allocated to the corresponding cell-site transmitted signal by a predetermined amount. The adjustment would usually be small, typically on the order of 0.5-1 dB, or around 12% more or less. Correspondingly the other cell-site transmitted signals are reduced by a factor of the increase divided by n, where n is the number of other channel units communicating to a mobile telephone. Typically the decrease in power may be on the order of 0.05 dB. The rate of change of power may be somewhat slower than that used for the inbound link from the mobile unit to cell-site, perhaps once per second. The dynamic range of the adjustment would also be limited to 4 dB less than nominal to about 6 dB greater than nominal. It should be understood the power increase and decrease levels are for purposes of example and that other levels may be readily selected depending on system parameters.

The cell-site must also consider the power demands being made on it by all the mobiles in deciding whether to comply with the requests of any particular mobile. For example, if the cell-site is loaded to capacity, requests for additional power might be granted but only by 6% or less, instead of the normal 12%. In this regime, a request for a reduction in power would still be granted at the normal 12% change.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
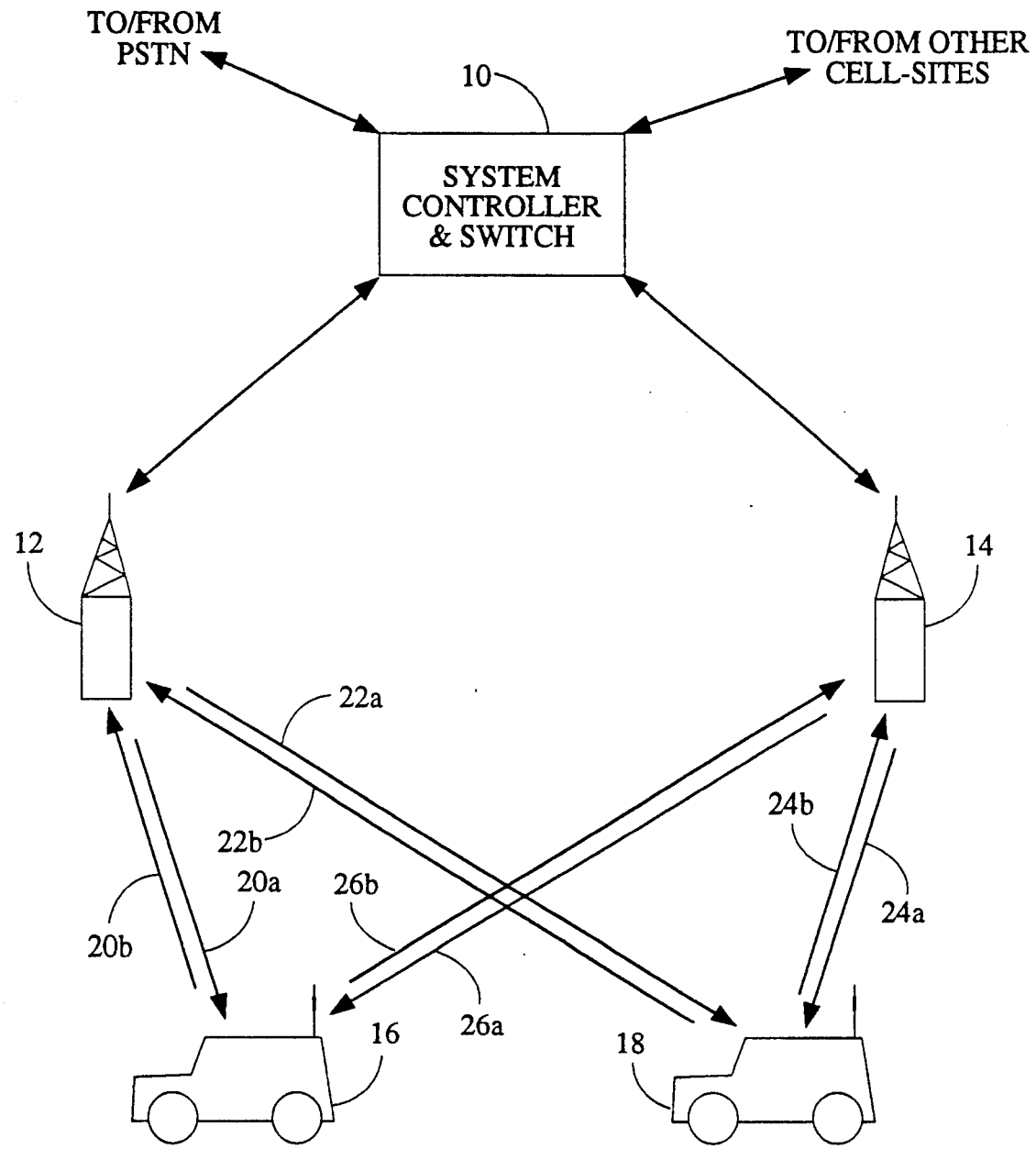
FIG. 1 is a schematic overview of an exemplary mobile cellular telephone system.

An exemplary terrestrial cellular mobile telephone system in which the present invention is embodied is illustrated in FIG. 1. The system illustrated in FIG. 1 utilizes CDMA modulation techniques in communications between the system mobile user, and the cell-sites. Cellular systems in large cities may have hundreds of cell-site stations serving hundreds of thousands of mobile telephones. The use of CDMA techniques readily facilitates increases in user capacity in systems of this size as compared to conventional FM modulation cellular systems.

In FIG. 1, system controller and switch 10, typically includes appropriate interface and processing hardware for providing system control information to the cell-sites. Controller 10 controls the routing of telephone calls from the public switched telephone network (PSTN) to the appropriate cell-site for transmission to the appropriate mobile unit. Controller 10 also controls the routing of calls from the mobile units via at least one cell-site to the PSTN. Controller 10 may direct calls between mobile users via the appropriate cell-site stations since such mobile units do not typically communicate directly with one another.

Controller 10 may be coupled to the cell-sites by various means such as dedicated telephone lines, optical fiber links or by radio frequency communications. In FIG. 1, two exemplary cell-sites, 12 and 14, along with two exemplary mobile units 16 and 18 which include cellular telephones are illustrated. Arrows 20a-20b and 22a-22b respectively define the possible communication links between cell-site 12 and mobile units 16 and 18. Similarly, arrows 24a-24b and arrows 26a-26b respectively define the possible communication links between cell-site 14 and mobile units 18 and 16. It should be understood that each communication link may include multipath propagations of signals communicated between cell-sites and mobile units. Furthermore cell-sites 12 and 14 normally transmit using equal power, however cell-site transmission power may also be controlled to be set at various power levels.

Cell-sites 12 and 14 are in the typical case are terrestrial base stations which define cell service areas, however it should be understood that earth orbit relay satellites, such as satellites 13 and 15, may be used to provide more complete cellular coverage, particularly for remote areas. In the satellite case, signals are relayed between the mobile users and the terrestrial base stations using satellites 13 and 15. As in the terrestrial only case, the satellite case also provides the ability for communication between a mobile unit and one or more base stations via multiple transponders on the same satellite or through different satellites.

Mobile unit 16 measures the total received power in signals transmitted by cell-sites 12 and 14 upon paths 20a and 26a. Similarly, mobile unit 18 measures the total received power in signals as transmitted by cell-sites 12 and 14 upon paths 22a and 24a. In each of mobile units 16 and 18, signal power is measured in the receiver where the signal is a wideband signal. Accordingly, power measurement is made prior to correlation of the received signal with a pseudonoise (PN) spectrum spreading signal.

When mobile unit 16 is closer to cell-site 12, the received signal power will be dominated by the signal traveling path 20a. When mobile unit 16 is nearer to cell-site 14, the received power will be dominated by the signal traveling on path 26a. Similarly, when mobile unit 18 is closer to cell-site 14, the received power will be dominated by the signal on path 24a. When mobile unit 18 is closer to cell-site 12, the received power will be dominated by the signal traveling on path 22a.

Each of mobile units 16 and 18 uses the resultant measurement, together with knowledge of the cell-site transmitter power and the mobile unit antenna gain to estimate the path loss to the closet cell-site. The estimated path loss, together with knowledge of the mobile antenna gain and the cell-site G/T is used to determine the nominal transmitter power required to obtain the desired carrier-to-noise ratio in the cell-site receiver.

The knowledge by the mobile units of the cell-site parameters may be either fixed in memory or transmitted in cell-site information broadcast signals, setup channel, to indicate other than nominal conditions for a particular cell-site.

In the preferred embodiment a technique is employed which avoids the necessity of actually determining path loss so that a correction can be made to the mobile unit transmitter power. As mentioned previously, the cell-site need only compute and transmit a "constant" parameter to the mobile unit. The value of this parameter as used by the mobile unit is equal to the sum of the measured combined wideband received signal power level and the desired transmission power level. Thus from the received parameter and the measured signal power, transmit power may be readily determined. The transmitted "constant" parameter is set at the cell-site based upon known cell-site parameters so as to provide from the mobile unit a transmit power level sufficient for the signal to be demodulated at the cell-site. As mentioned previously the "constant" may be changed as cell-site transmitter power changes.

As a result of the determination of the mobile unit nominal transmit power, in the absence of Rayleigh fading and assuming perfect measurements, the mobile unit transmitted signals will arrive at the nearest cell-site precisely at the desired carrier-to-noise ratio. Thus the desired performance will be obtained with the minimum amount of mobile unit transmitter power. The minimization of the mobile unit transmitted power is important in a CDMA system because each mobile unit causes interference to every other mobile unit in the system. In minimizing the mobile unit transmitter power, system interference will be held to a minimum, thus allowing additional mobile users to share the frequency band. Accordingly, system capacity and spectral efficiency is maximized.

Figure 2A:
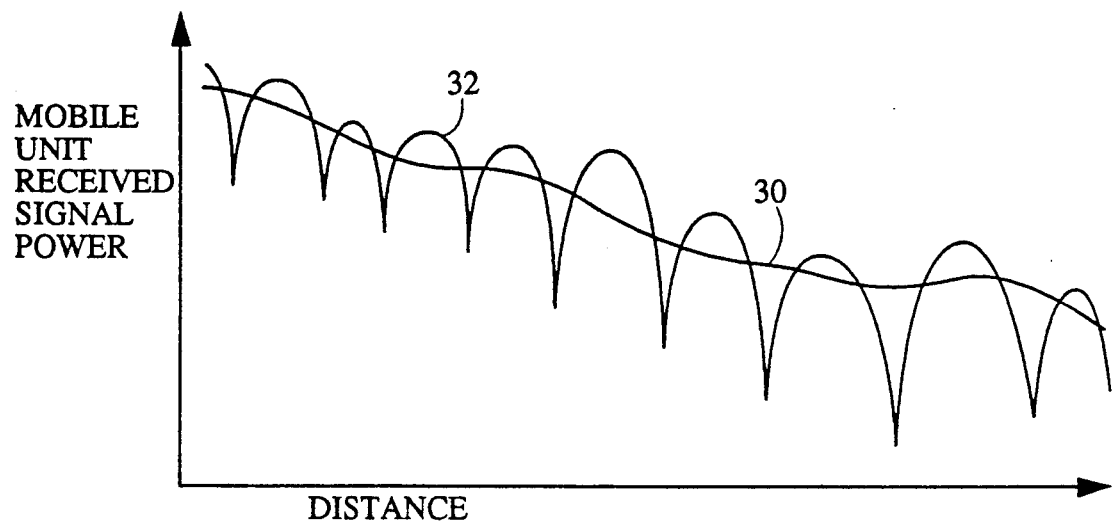
FIGS. 2A-2D illustrate, in a series of graphs, mobile unit received signal power, mobile unit transmit power and cell-site received signal power as a function of distance.
Figure 2B:
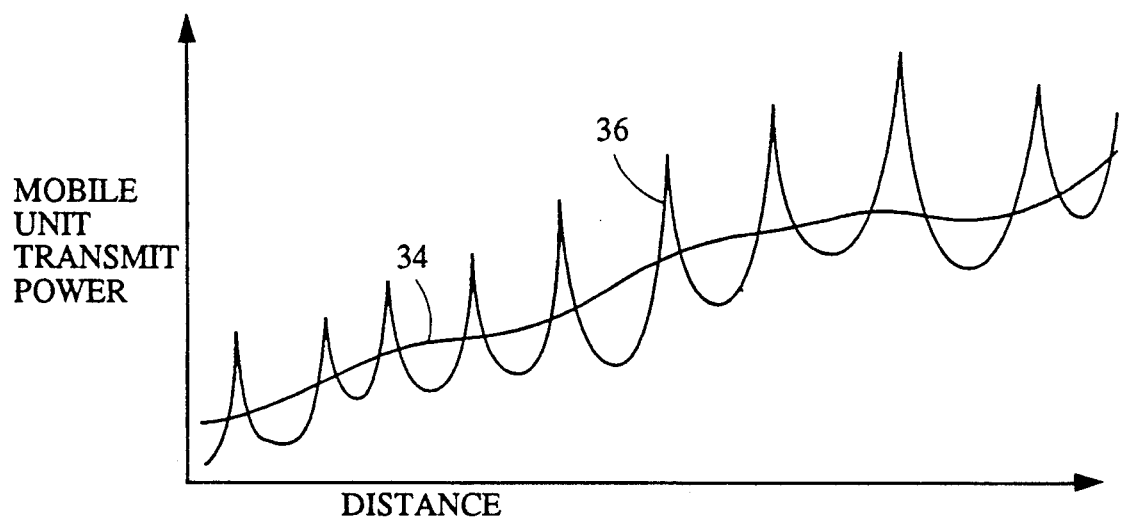
Figure 2C:
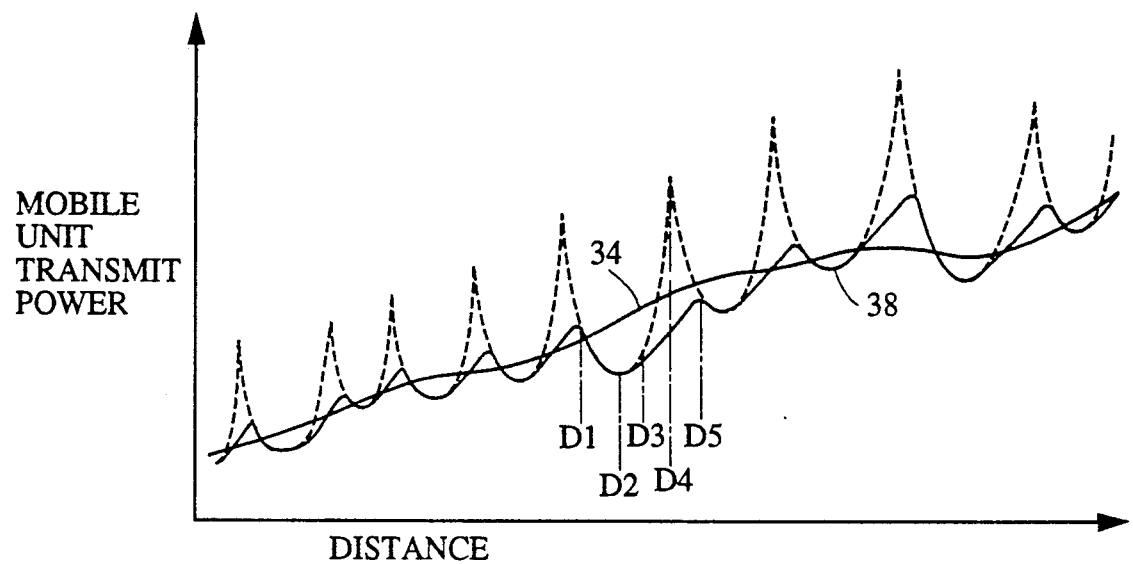
Figure 2D:
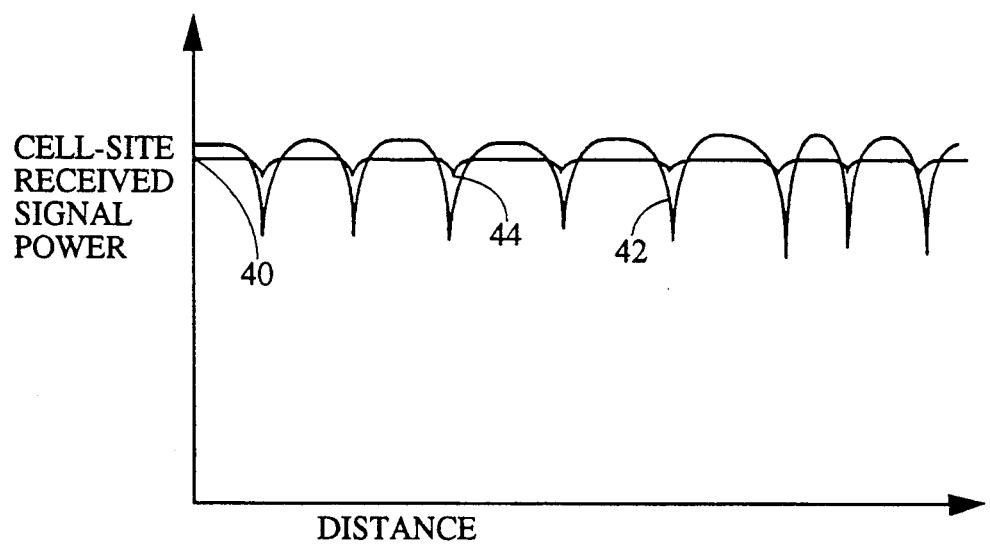

FIGS. 2A-2C graphically illustrate the effects of path loss and Rayleigh fading on signal power as a function of distance for a moving vehicle. In these graphs it should be understood that the rate of Rayleigh fading as illustrated therein is exaggerated from the actual terrestrial cellular telephone environment. The rate of a fade in the actual environment is at rate such that open loop transmitter power control circuitry of the present invention is sufficiently fast enough to provide communication signals at a power level necessary to overcome the fade. Since the open loop transmitter power control circuitry is able to track channel degradation and improvements, for which transmission power is respectively increased and decreased, a limit on the rate of increase in transmission power is believed to be unnecessary. However an optional non-linear filter may be employed, if necessary, at the mobile unit to limit the rate of increase of transmitter power as compared to the rate decrease of transmitter power.

Furthermore the use of a closed loop power control scheme can correct for various erroneous open loop controlled power increases/decreases resulting from other than Rayleigh fading. As mentioned previously, a measurement of the outbound signal power is used to determine the inbound signal power transmission level. Thus, errors in inbound signal power level may occur since both the inbound and outbound channels may fade differently. The closed loop power control scheme is sufficiently fast enough to correct for these errors in the terrestrial channel environment without the need for slowing down the increase in transmission power by a non-linear filter which limits the rate of an open loop power increase.

Absent a sufficiently fast closed loop feedback system it is desirable to use some technique, such as a non-linear filter, to slow down rapid open loop increases in transmitter power. In using a non-linear filter the communication quality with that particular mobile user may suffer somewhat. However on a system level it is better to tolerate a degradation in the communications of one mobile unit suffer rather than have all other mobile units in the system affected a significant increase in transmitter power by the one mobile unit.

FIG. 2A illustrates the effect of both Rayleigh fading as a function of distance on the strength of the cell-site transmitted signal as received at a mobile unit. The average path loss, indicated by curve 30, is determined primarily by the fourth-power of the distance between the cell-site and the mobile unit, and by the shape of the terrain between them. As distance increases between the mobile unit and the cell-site, signal power decreases as received at the mobile unit for a constant power transmitted cell-site signal. The average path loss is the same for both directions of the link, and typically exhibits a log-normal distribution about the average path loss.

In addition to the slowly varying log-normal average path loss, the rapid fading up and down around the average path loss is caused by the existence of multiple path signal propagation. The signals arrive from these multiple paths in random phase and amplitude, resulting in the characteristic Rayleigh fading. Curve 32, as illustrated in FIG. 2A, represents the variation in signal path loss as a result of Rayleigh fading. The Rayleigh fading is typically independent for the two directions of the cell-site/mobile unit communication link, i.e. outbound and inbound channels. For example, when the outbound channel is fading, the inbound channel is not necessarily fading at the same time.

FIG. 2B illustrates the mobile unit transmitter power adjusted to correspond to the link path signal strength of FIG. 2A. In FIG. 2B, curve 34 represents the desired average transmit power corresponding to the average path loss of curve 30 of FIG. 2A. Similarly, curve 36 corresponds to the mobile unit transmitter power responding to the Rayleigh fading as represented by curve 32 of FIG. 2A. As the Rayleigh faded signal, curve 32 of FIG. 2A, decreases in signal strength, rapid increases in transmitter power result. These rapid upward excursions of transmitter power can result in deleterious effects in overall system performance. The use of closed loop power adjustment feedback from the cell-site to adjust mobile unit transmitter power can be used to limit the increase in transmitter power.

FIG. 2C is a graph illustrating the cell-site received signal power strength with respect to transmissions of the mobile unit as it travels from the cell-site. Curve 40 indicates the desired average received signal power at the cell-site for a signal transmitted from a mobile unit. It is desirable that the average received signal power be at a constant level, yet a minimum necessary to assure a quality communication link with the mobile unit. Corrections are made at the mobile unit to correct for Rayleigh fading in the cell-site transmitted signal.

The mobile unit transmitted signal experiences Rayleigh fading before arriving at the cell-site receiver. The signal received at the cell-site is therefore a signal of constant average received power level but still with the Rayleigh fading of the inbound channel impressed thereupon. Curve 42 represents the Rayleigh fading that occurs on the inbound signal absent power correction from the mobile unit open loop power control system based upon outbound signal fading. In the terrestrial channel a high speed open loop power control power control process is utilized to compensate for Rayleigh fading on the inbound channel. In the satellite repeater situation the speed at which the open loop power control operates is slowed down.

Additionally, there is the possibility that the mobile unit may come to rest at a place where the outbound link is not faded but yet the inbound link is severely faded. Such a condition would disrupt communications unless an additional mechanism is employed to compensate for the inbound channel Rayleigh fading. The closed loop power adjustment command process employed at the cell-site is such a mechanism for adjusting the mobile unit transmitter power, so as to compensate for the Rayleigh fading on the inbound channel. In FIG. 2C, curve 44 illustrates the mobile unit transmitted signal power as received at the cell-site when compensating for average path loss and Rayleigh fading on both the inbound and outbound channels. As can be seen in FIG. 2C curve 44 follows close to curve 40 except for instances of severe fading where the fading process is minimized by the closed loop control.

Figure 3:
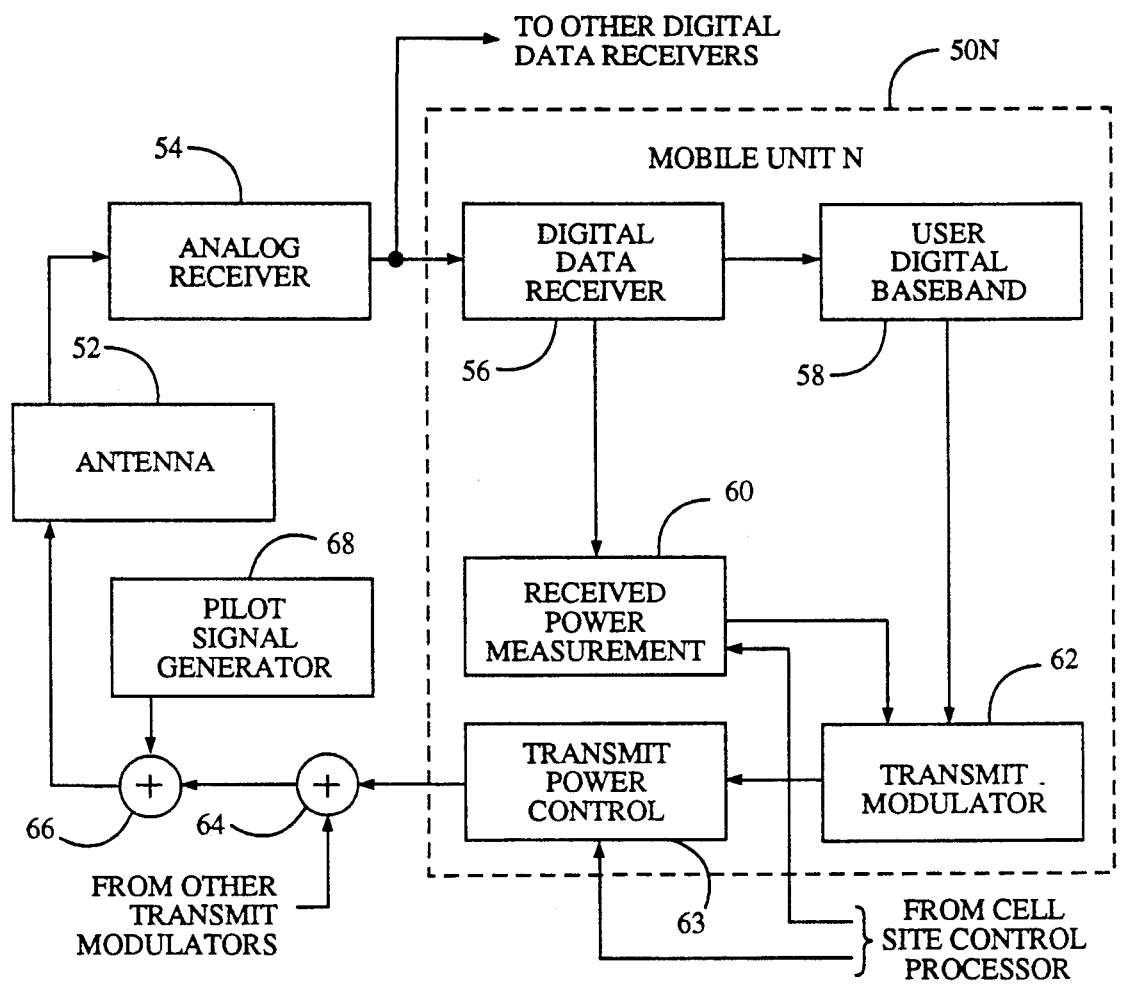
FIG. 3 is a block diagram of a cell-site with particular reference to power control features.

In FIG. 3, an exemplary implementation of a cell-site transceiver system, which incorporates power control features, is illustrated. Further details on the specific modulation scheme and the implementation thereof are disclosed in copending U.S. patent application Ser. No. 07/543,492, filed Jun. 25, 1991, entitled "SYSTEM AND METHOD FOR GENERATING SIGNAL WAVEFORMS IN A CDMA CELLULAR TELEPHONE SYSTEM" now U.S. Pat. No. 5,103,459 issued Apr. 7, 1992, assigned to the assignee of the present invention and the disclosure of which is also incorporated by reference. In FIG. 3, an antenna system 52 is provided for receiving multiple mobile unit transmitted signals which are then provided to analog receiver 54 for amplification, frequency downconversion and IF processing of the received RF signal. Analog receiver 54 includes a frequency downconverter, bandpass filter, automatic gain control (AGC) circuitry and an analog to digital converter, as is common to analog receivers for use in digital transmission systems. The AGC circuitry normalizes the received wideband signal which includes all user signals prior to analog to digital conversion. The analog signals output from receiver 54 are provided to a plurality of receiver modules or channel units for, extraction of user directed information signals, generation of power adjustment commands, and modulation of user input information signals for transmission. One such module used in communications with a particular mobile unit, such as mobile unit N, is module 50N. Thus the output of receiver 54 is provided to a plurality of these modules including module 50N. In module 50N the desired mobile unit N signal is extracted from the normalized received wideband signal.

Module 50N comprises digital data receiver 56, user digital baseband circuit 58, received power measurement circuitry 60 and transmit modulator 62. Digital data receiver 56 receives the wideband spread spectrum signals for correlating and despreading the mobile unit N transmitted signal to a narrowband signal for transfer to an intended recipient communicating with mobile unit N. Digital data receiver 56 provides the desired user narrowband digital signals to user digital baseband circuitry 58. Digital data receiver 56 also provides the desired user narrowband signal to received power measurement circuitry 60.

Received power measurement circuitry 60 measures the power level in the received signal from mobile unit N. Since the received wideband signal is normalized in analog receiver 54, the measurement made by received power measurement circuitry 60 is not an absolute power measurement. The measurement made by received power measurement circuitry 60 is in reality a value which is representative of a signal to noise ratio of the desired signal to that of the total noise. Received power measurement circuitry 60 in response to the measured level of power generates a power adjustment command which is input to transmit modulator 62 for transmission to mobile unit N. As previously discussed, the data bits in the power adjustment command are used by mobile unit N in adjusting mobile unit transmitter power.

When the received power measurement is greater than the preset level provided by a cell-site processor (not shown), an appropriate power adjustment command is generated. Should the received power measurement be less than the preset level, the power adjustment command data bits are generated and indicate that an increase in mobile unit transmitter power is necessary. Similarly, if the received measurement is greater than the preset level, the power adjustment command is generated such that the mobile unit transmitter power is reduced. The power adjustment command is utilized to maintain a nominal received power level at the cell-site.

The signal output from digital data receiver 56 is provided to user digital baseband circuitry 58 where it is interfaced for coupling to the intended recipient via the system controller and switch. Similarly, baseband circuitry 58 receives user information signals intended for mobile unit N and provides them to transmit modulator 62.

Transmit modulator 62 spread spectrum modulates the user addressable information signals for transmission to mobile unit N. Transmit modulator 62 also receives the power adjustment command data bits from received power measurement circuitry 60. The power adjustment command data bits are also spread spectrum modulated by transmit modulator 62 for transmission to mobile unit N. Transmit modulator 62 provides the spread spectrum modulated signal via transmit power control circuitry 63 to summer 64 where combined with spread spectrum signals from other module transmit modulators also located at the cell-site.

The combined spread spectrum signals are input to summer 66 where they are combined with a pilot signal provided by pilot signal generator 68. These combined signals are then provided to circuitry (not shown) for frequency upconversion from the IF frequency band to the RF frequency band and amplified. The RF signals are then provided to antenna 52 for transmission. Although not illustrated, transmit power control circuitry may be disposed between summer 66 and antenna 52. This circuitry, under control of the cell-site processor, is responsive to power adjustment command signals transmitted by the mobile unit which are demodulated at the cell-site receiver and provided to the cell-site control processor for coupling to the circuitry.

Figure 4:
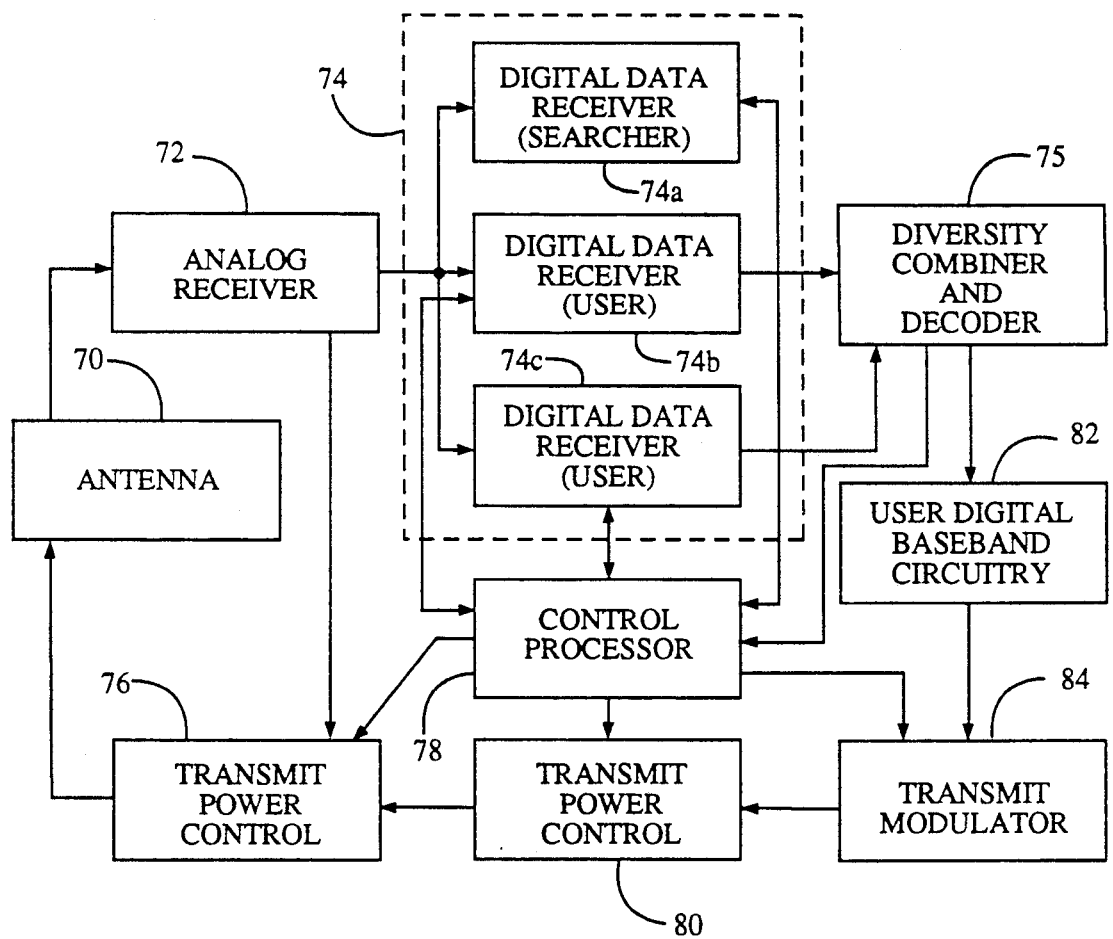
FIG. 4 is a block diagram of the mobile unit with particular reference to the power control features.

In FIG. 4, the mobile unit, such as mobile unit N, includes an antenna system 70 for collecting cell site transmitted signals and radiating mobile unit generated CDMA signals. Typically antenna system 70 is comprised of a single antenna coupled by a duplexer to analog receiver 72 and transmit power control circuitry 76. In the alternative two separate antennas, one for transmission and another for reception. Mobile unit N receives the pilot signal, setup channel signals and the mobile unit N addressed signals using antenna system 70, analog receiver 72 and digital data receiver system 74. Receiver 72 amplifies and frequency downconverts the received RF CDMA signals to IF, and filters the IF signals. The IF signals are output to digital data receiver 74 for digital processing. Receiver 72 also includes circuitry for performing an analog measurement of the combined power of the received signals. This power measurement is used to generate a feedback signal that is provided to transmit power control circuitry 76 for controlling transmit power.

Digital data receiver system 74 is comprised of multiple digital data receivers. One digital data receiver, receiver 74a is used to search for pilot signals that are transmitted by each cell-site. These pilot signals may be multipath signals of a same cell-site, pilot signals transmitted by different cell-sites, or a combination of both. The different cell-site transmitted pilot signals are each of a same spreading code but of at a different code phase offset for identification of the particular cell-site. Receiver 74a provides to control processor 78 signals indicative of the strongest pilot signals, whether they be multipath signals of a single cell-site or from different cell-sites. Control processor 78 uses the information provided from receiver 74a in establishing and maintaining communication with the cell-site or cell-site.

Digital data receiver system 74 is further comprised of digital data receivers 74b and 74c. Although only two receivers are illustrated, additional receivers may be provided. Receivers 74a and 74b are used for despreading and correlating the received signals addressed to mobile unit N from one cell-site or from multiple cell-sites for cell diversity mode communications. Receivers 74b and 74c are assigned to process different multipath signals from the same cell-site, or signals from different cell-sites when in a cell diversity mode. Under the control of control processor 78, receivers 74b and 74c process the assigned signal intended for the mobile user. Typically receivers 74b and 74c are assigned to process the spread spectrum digital user data signal which correspond to the strongest pilot signals identified by receiver 74a.

Receivers 74b and 74c provides demodulated user data such as digitized encoded speech to diversity combiner and decoder circuitry 75. Circuitry 75 coherently combines the different signals from receivers 74b and 74, whether they be multipath signals or cell diversity signal so as to provide a single user data signal. Circuitry 75 also performs decoding and error correction on the user data. The signal output from circuitry is provided to digital baseband circuitry 82 for interface with the user. Baseband circuitry 82 includes interface hardware for coupling receiver 74 and transmit modulator 82 to the user handset (not shown). Control information, such as the cell-site transmitted power level setting parameter, is provided from circuitry 75 to control processor 80.

Receivers 74b and 74c also separate the digital user data from the power adjustment commands generated by the cell-site(s) and transmitted in the user data signals. The extracted power adjustment command data bits are sent to control processor 78. Processor 78 analyzes the power adjustment commands to so as to provide control over the mobile unit transmitter power.

In the single cell situation when either one or more (multipath) signals are the signals assigned to be processed by receivers 74b or/and 74c, the power adjustment commands are recognized as originating from a single cell-site. In this case, processor 78 is responsive to the power adjustment command data bits generates a transmit power control command that is provided to transmit power control circuitry 80. When the power adjustment commands indicate that additional mobile unit transmitter power is required, processor 78 provides a signal to transmit power control circuitry 76 to increase transmitter power. Similarly, when the power adjustment commands indicate that less mobile unit transmitter power is required, processor 78 provides a signal to transmit power control circuitry 76 to decrease transmitter power. However, in the cell diversity situation additional factors must be taken into consideration by processor 78.

In the cell diversity situation, the power adjustment commands are arriving from two different cell-sites. Mobile unit transmitter power as measured at these different sites may be different, and therefore care must be taken in controlling the mobile unit transmitter power to avoid transmitting at a level that would adversely affect communications between the cell-sites and other users. Since the cell-site power adjustment command generation process is independent from each other cell-site, the mobile unit must respond to the received commands in a manner that does not affect other users.

In the cell-diversity situation should both cell-sites provide power adjustment commands to the mobile unit requesting additional power, control processor operates in a logical AND function and generates a power control signal to transmit power control circuitry 76 indicative of an increase in transmitter power. In this example a request for a power increase request corresponds to a logical "1" while a power decrease request corresponds to a logical "0". Transmit power control circuitry 76 is responsive to this type of power control signal so as to increase the transmitter power. This situation may occur when the communication path to both cell-sites is degraded for one or more reasons.

In the case when one cell-site requests an increase in transmitter power but the other one requests a decrease, processor 78 again operates in the above mentioned logical AND function to generate a power control signal to transmit power control circuitry 76 indicative of an decrease in transmitter power. Transmit power control circuitry 76 is responsive to this type of power control signal so as to decrease the transmitter power. This situation may occur when the communication path to one cell-site is degraded while the communication path to the other cell-site becomes improved.

In summary, mobile unit transmitter power is increased only when all cell-sites in which the mobile unit is in communication with request an increase in power, and is decreased when any one or more of these cell-sites request a decrease in power. In this scheme, a mobile unit will not transmit at a power level that would unnecessarily increase the level of system interference for other users, but yet maintain a level that would facilitate communication with at least one cell-site.

Further discussion on the function of receiver system 74 in communications with multiple cell-sites is provided in previously mentioned copending U.S. patent application Ser. No. 07/432,552, entitled "DIVER- SITY RECEIVER IN A CDMA CELLULAR TELEPHONE SYSTEM" (U.S. Pat. No. 5,119,390). The function is also further exemplified in previously mentioned copending U.S. patent application Ser. No. 07/433,030, entitled "METHOD AND SYSTEM FOR PROVIDING A SOFT HANDOFF IN COMMUNICATIONS IN A CDMA CELLULAR TELEPHONE SYSTEM" (U.S. Pat. No. 5,101,501).

Processor 78 also provides a level set command to transmit power control circuitry 76 for use in setting transmitter power level in the width respect to the wideband power measurement from analog receiver 72. Further details on the interaction of receiver 72, transmit power control circuitry 76 and 80, and processor 78 are described in further detail with reference to FIG. 5.

Data to be transmitted is provided through baseband circuitry 82 where it is encoded and provided to transmit modulator 84. The data is spread spectrum modulated by transmit modulator 84 according to an assigned spreading code. The spread spectrum signals are output from transmit modulator 84 to transmit power control circuitry 80. The signal power is adjusted in accordance with the transmit power control command provided by control processor 78. This power adjusted signal is provided from transmit power control circuitry 80 to transmit power control circuitry 76 where the signal is adjusted in accordance with the analog measurement control signal. Although illustrated as two separate units for controlling the transmit power, the power level could be adjusted by a single variable gain amplifier with two input control signals combined before being applied to the variable gain amplifier. However in the illustrated exemplary embodiment the two control functions are shown as separate elements.

In the operation of the power control circuitry illustrated in FIG. 4, receiver 72 measures the combined wideband signal power for all signals received from all cell-sites. These power level measurement results are used in controlling the power level as set by transmit power control circuitry 76.

Figure 5:
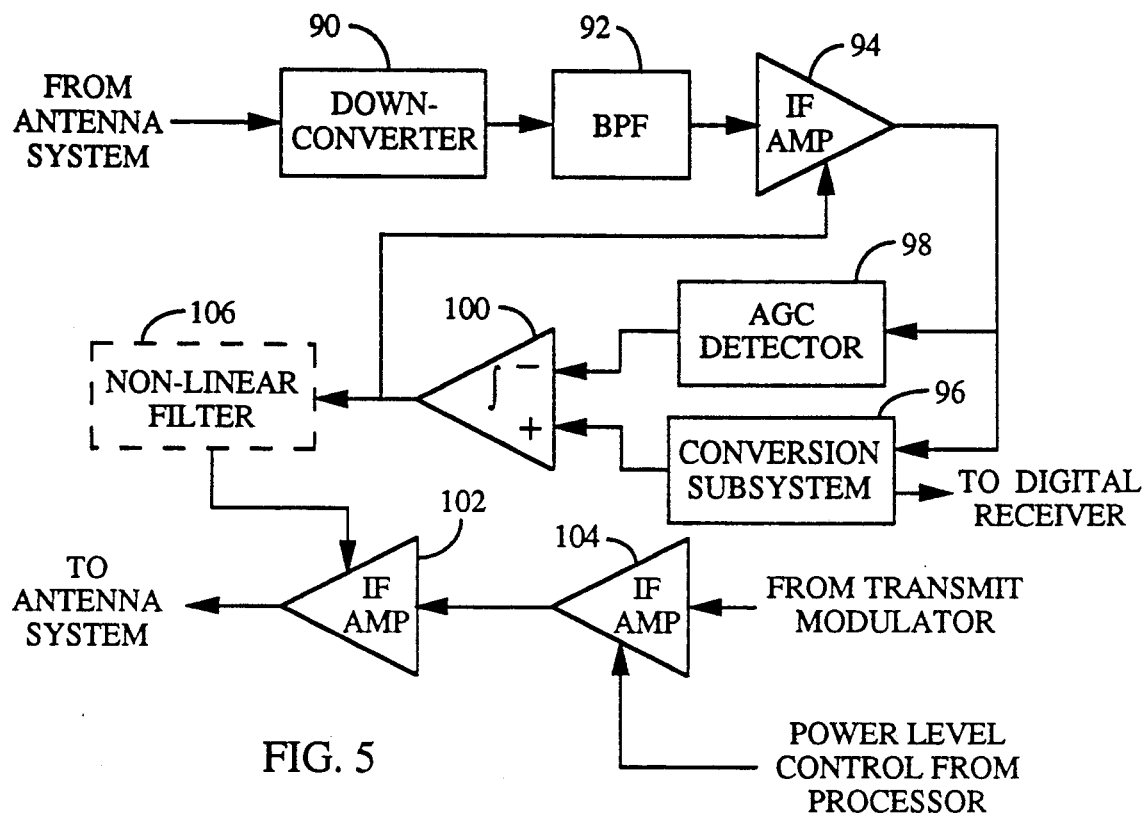
FIG. 5 is a block diagram illustrating in further detail the power control features of the mobile unit of FIG. 4.

FIG. 5 illustrates in further detail the power control aspect of mobile unit N discussed with reference to FIG. 4. In FIG. 5, received RF signals from the antenna are provided to frequency downconverter 90 where the received RF signals are converted to an IF frequency. The IF frequency signals are coupled to bandpass filter 92 where out of band frequency components are removed from the signals.

The filtered signals are output from filter 92 to variable gain IF amplifier 94 where the signals are amplified. The output of amplifier 94 is coupled to conversion subsystem 96 and automatic gain control (AGC) detector circuit 98.

AGC detector circuit 96 provides an output signal indicative of the signal strength of the received signal. This signal strength signal is provided as one input of differential integrator 100. The other input of differential integrator 100 is provided with an A/D input level control signal from conversion subsystem 96.

In a preferred embodiment, conversion subsystem 96 is comprised of frequency downconversion circuitry, analog to digital conversion circuitry (all not shown) and level setting circuitry. The frequency downconversion circuitry receives the received signal output from amplifier 94 and mixes in a mixer the received IF signal with a reference signal so as to produce corresponding signal at lower IF frequency. The frequency downconverted signal is typically filtered and then using a power splitter splits the signal into two paths (I and Q). The signal on each path is mixed in a corresponding mixer with an in-phase and quadrature (I/Q) reference signal, the Q reference signal being phase shifted by 90° with respect to the I reference signal. The resulting signals are filtered and provided as I and Q baseband signals to the analog to digital conversion circuitry.

In the analog to digital conversion circuitry the I and Q baseband signals are input to a respective analog to digital converter. The resultant digitized I and Q baseband signals are provided to the digital receiver for digital demodulation, including despreading of the spread spectrum data, so as to extract information contained in the spread spectrum data. The digitized I and Q baseband signals are also provided to the level setting circuitry.

The level setting circuitry receives in mean square logic the digitized I and Q baseband signals where the means square of the I and Q values is computed. Any scheme which reflects a monotonic estimate of baseband power is equivalent. The means square output value is then provided to scaling and level shifting logic. The scaling and level shifting logic scales the value with respect to an internal value so as to provide a resultant D/A input value. The D/A input value is of a value which ensures that the received signal best matches the conversion range of the A/D converters in the analog to digital conversion circuitry. For example the D/A input value may correspond to a value of which provides a signal to the A/D converters at one-third the maximum range of the A/D converters. The D/A input value is provided to a digital to analog converter where converted to an analog signal that is provided as the second input to differential integrator 100 as an open loop power level set signal.

The open loop power level set signal and the signal strength signal are differentially integrated by integrator 100 to generate a resultant gain control signal that is provided a respective gain control input of both amplifier 94 and variable gain IF amplifier 102.

The gain control signal as provided to amplifier 94 is used to normalize the received signal power to a specific choice of an A/D input level. As such the gain control signal is used to control the gain of the amplifier 94 so as to maintain a constant average power level as output from amplifier 94 to the A/D converters in conversion subsystem 98. The use of the same gain control signal and amplifier configuration for amplifiers 94 and 102 allows the transmitter power to track the received signal power.

AGC detector circuit 98, conversion subsystem 96 and integrator 100 thus estimate the received mobile unit signal power to determine the open loop power correction necessary for the mobile unit transmitter. This correction is used to maintain a desired transmitter power level in conditions of fading on the outbound channel that are common to the inbound channel.

An optional non-linear filter 106 may be disposed between the output of integrator 100 and the gain control input of amplifier 102. Filter 106 may be used to limit the rate of increase of in the gain control signal as applied to amplifier, thus also limiting the rate of increase in amplifier 102 gain. Filter 106 may be configured as a simple resistor-diode-capacitor circuit. For example, the input to the circuit is a common node shared by two resistors. The other end of each resistor is coupled to a respective diode. The diodes are reversed in their connection to the resistors and the other end of each diode coupled together at a common node as an output of the filter. A capacitor is coupled between the diode common node and ground. The filter circuit is may be designed to limit the rate of power increase to less than 1 dB per millisecond. The rate of power decrease for example could be set to be about ten times faster than the rate of power increase, i.e. 10 dB per millisecond. The output of filter 106 is provided as a modified gain control signal to the gain control input of amplifier 102. Typically the rate of increase is set to be no faster than the rate at which transmit power control circuitry 80 can turn the power down in response to a series of downward commands from the cell-site as processed by receiver 74 and processor 78.

In a preferred embodiment, amplifiers 94 and 102 are each configured as series coupled dual gate FET transistors with a surface acoustic wave bandpass disposed therebetween. In order to correct for inherent nonlinearities of the transistors so as to provide linear gain operation over an extended dynamic range, a gain compensation circuit is used to modify the gain control signal as input to the transistors. Further details on the specific implementation of this circuitry are provided in copending U.S. patent application Ser. No. 07/598,845, filed Oct. 15, 1990, entitled "LINEAR GAIN CONTROL AMPLIFIER" now U.S. Pat. No. 5,099,204 issued Mar. 24, 1992, also assigned to the assignee hereof and incorporated by reference. Further details on an implementation of the feedback loop comprised of amplifier 94, AGC detector circuit 98 and comparator 100 which provide the gain control are provided in copending U.S. patent application Ser. No. 07/620,092, filed Nov. 30, 1990, entitled "HIGH DYNAMIC RANGE CLOSED LOOP AUTOMATIC GAIN CONTROL CIRCUIT" now U.S. Pat. No. 5,107,225 issued Apr. 21, 1992, also assigned to the assignee hereof and incorporated by reference.

Transmit modulator circuit 84 of FIG. 4, provides a low power, IF frequency spread spectrum signal to an input of variable gain IF amplifier 104. Amplifier 104 is gain controlled by a power level control signal from processor 78 (FIG. 4). This power level control signal is derived from the closed loop power adjustment command signal transmitted by the cell-site and processed by the mobile unit as discussed with reference to FIG. 4, in conjunction with the received power level setting parameter.

The power adjustment command signal consists of a sequence of power-up and power-down commands that are accumulated in the mobile unit processor. The mobile unit control processor starts with the gain control level set to a nominal value, as determined by the power level setting parameter. Each power-up command increases the value of the gain control command corresponding to a resultant approximate 1 dB increase in amplifier gain. Each power-down command decreases the value of the gain control command, corresponding to a resultant approximate 1 dB decrease in amplifier gain. The gain control command is converted to analog form by a digital to analog (D/A) converter (not shown) before applied to amplifier 104 as the power level control signal.

The mobile unit reference power level may be stored in the memory of the control processor. In the alternative, the mobile unit reference power level may be contained within a signal sent to the mobile unit. This signal command data is separated by the digital data receiver and interpreted by the control processor in setting the level. This signal as provided from the control processor is converted by a digital to analog (D/A) converter (not shown) before input to integrator 100.

The output of amplifier 104 is provided as an input to amplifier 102. Amplifier 102 as previously mentioned is also a variable gain IF amplifier with the gain determined according to the gain control signal output from integrator 100. The signal for transmission is thus amplified in accordance with the gain set by the gain control signal. The amplified signal output from amplifier 102 and is further amplified and frequency translated to the RF frequency for transmission. The RF signal is then fed to the antenna for transmission.

Figure 6:
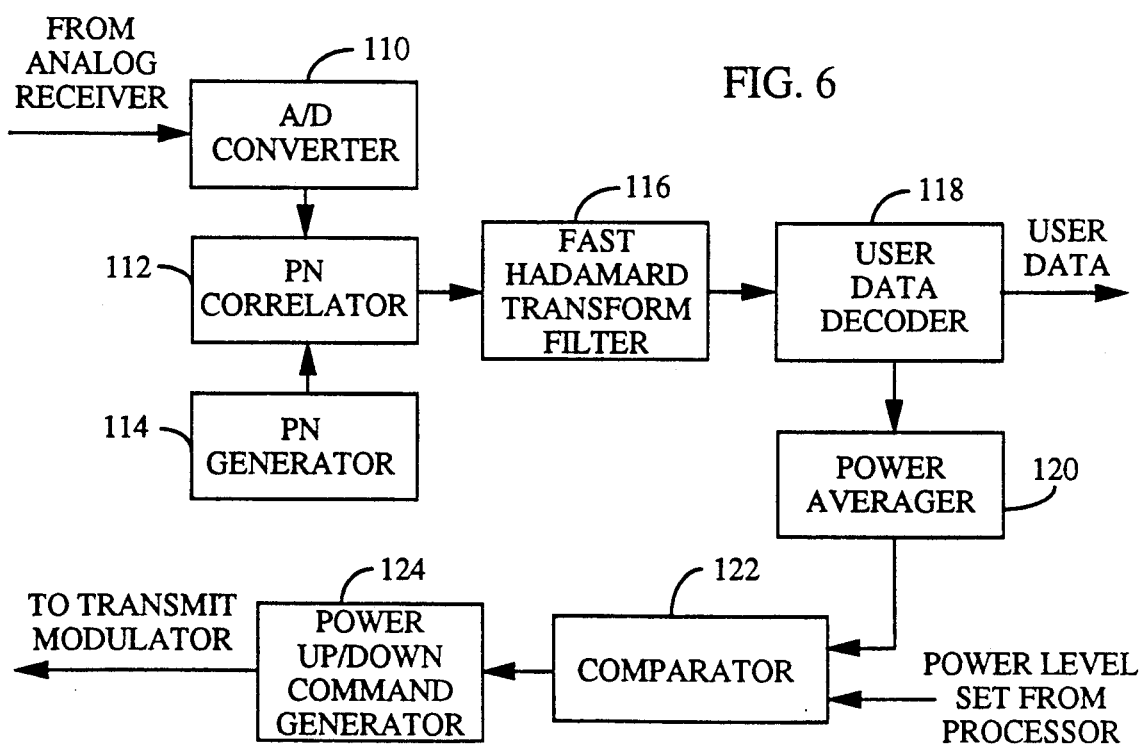
FIG. 6 is a block diagram illustrating in further detail the power control features of the cell-site of FIG. 3.

FIG. 6 illustrates in further detail the power control scheme of the cell-site as illustrated in FIG. 3. In FIG. 6, a mobile unit transmitted signal is received at the cell-site. The received signal is processed by the cell-site analog receiver and cell-site corresponding to mobile unit N.

In the digital data receiver, receiver 56 of FIG. 3, the received analog signal is converted from analog to digital form by A/D converter 110. The digital signal output from A/D converter is provided to pseudorandom noise (PN) correlator 112 where the signal undergoes a correlation process with a PN signal provided from PN generator 114. The output of PN correlator 112 is provided to a fast Hadamard transform digital filter 116 where the signal is filtered. The output of filter 116 is provided to a user data decoder circuit 118 which provides user data to the user digital baseband circuitry. Decoder 118 provides the largest transform filter symbols to power averager circuit 120. Power averager circuit 120 averages the largest transform outputs over a one millisecond interval using well known digital techniques.

A signal indicative of each average power level is output from power averager 120 to comparator 122. Comparator 122 also receives a power level set signal indicative of the desired received power level. This desired received power level is set by the control processor for the cell-site. Comparator 122 compares the two input signals and provides an output signal indicative of the deviation of the average power level from the desired power level. This signal is provided output to power up/down command generator 124. Generator 124 in response to the comparison generates either a power-up or a power-down command. Power command generator 124 provides the power control commands to the cell-site transmit modulator for transmission and control of the transmitter power of mobile unit N.

If the received power at the cell-site is higher than that desired of mobile unit N, then a power-down command is generated and transmitted to mobile unit N. However, if the received power level at the cell-site is too low, then a power-up command is generated and transmitted. The up/down commands are transmitted at a high rate, nominally 800 commands per second in the exemplary embodiment. At one bit per command, the overhead of the power command is insignificant compared to the bit rate of a high quality digital voice signal.

The power adjustment command feedback compensates for changes in the inbound channel that are independent of the outbound channel. These independent inbound channel changes are not measured in the outbound channel signal. Therefore the path loss estimate based upon then outbound channel and the corresponding transmitter power adjustment do not reflect the changes in the inbound channel. Thus, the power adjustment command feedback is used to compensate for adjustments in the mobile unit transmitter power based on the inbound channel path loses that do not exist in the outbound channel.

In using a closed loop control process it is highly desirable for the command to arrive at the mobile unit before conditions change significantly. The present invention provides a novel and unique power control circuitry at the cell-site for minimizing delay and latency of measurement and transmission. The power control circuitry at the mobile unit, analog control and digital command response, provides a vastly improved power control process in the cellular mobile telephone system.

Figure 7:
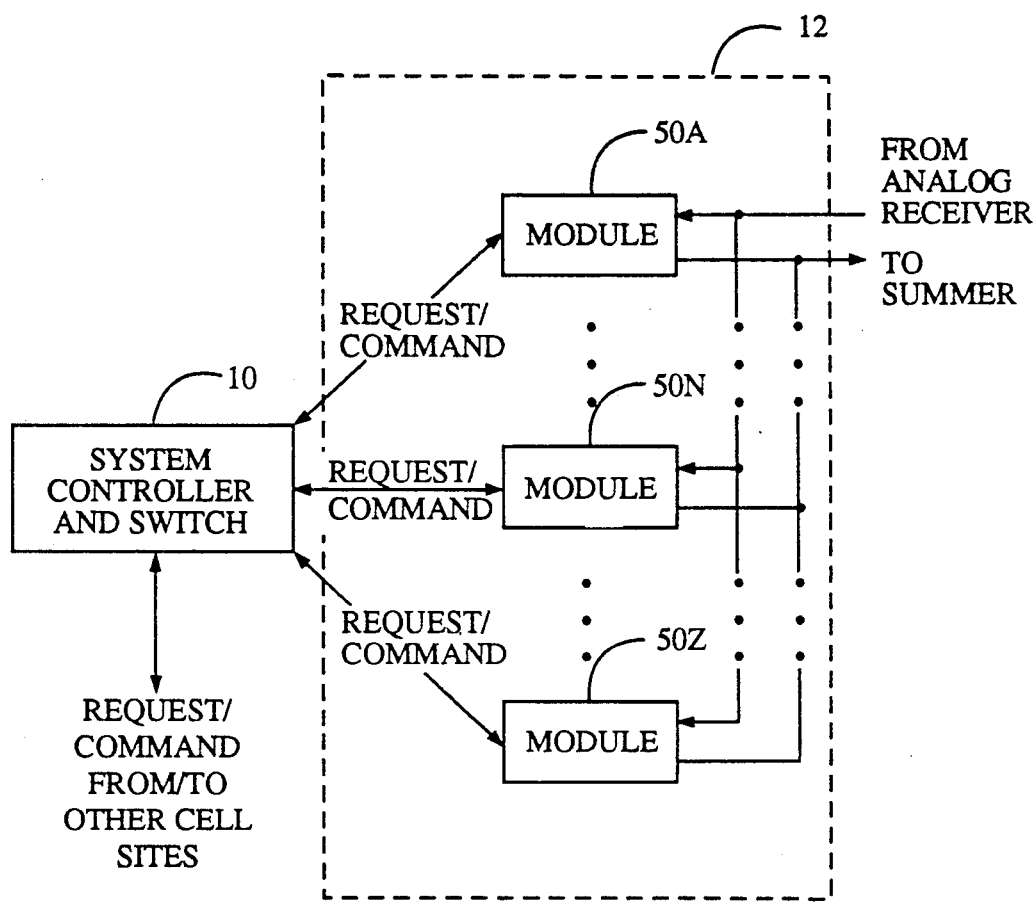
FIG. 7 is a block diagram of a cell-site/system controller configuration for cell-site transmitter power control.

As mentioned previously, it is also desirable to control the cell-site transmission power in response to requests from the mobile unit. FIG. 7 illustrates the typical cell-site configuration in which multiple modules 50A-50Z are included. Modules 50A-50Z are each identical in construction with that of module 50N of FIG. 3. In FIG. 7, mobile unit N is considered to be in communication with module 50N for purposes of illustration.

Each of modules 50A-50Z are coupled to system controller 10 as was discussed with reference to FIG. 1. Through the link to system controller 10, each module 50A-50Z demodulates and relays the mobile unit power requests to system controller 10. System controller 10 in response to a mobile unit request for an increase in module transmitter power may reduce all transmitter power for some or all other module transmitters by a small increment. System controller 10 would transmit a power control command to a cell-site, typically to the cell-site control processor. The cell-site control processor in response thereto reduces transmitter power of the cell-site other modules. The reduction in power of the other modules makes available an increase in power to the module servicing the requesting mobile user by n times the increment, where n is the number of modules reducing transmitter power. Using this technique there is no change in the total transmission power of the cell-site modules, i.e. no change in the sum of the individual module transmitter power.

Referring back to FIG. 3, module 50N transmits at a nominal power level as discussed above. The power level is set by a command from the cell-site control processor, with this command modified at the cell-site control processor by a command from the system controller. The command input to transmit power control circuitry 63 is used typically to decrease transmitter power. Transmit power control circuitry 63 may be configured as a variable gain amplifier as was discussed with reference to FIG. 5.

Referring to FIG. 4, at the mobile unit the quality of the received data signal is measured in the form of data frame errors. From this measurement the level of adequacy of the signal power is determined, where excessive frame errors are an indication insufficient signal power. Frame error information may be generated from the known error correction circuitry such as through the normalization rate of a Viterbi decoder or Cyclic Redundancy Check/Code (CRC), or a combination thereof. Various other techniques that are well known in the art may be used for indirectly or directly measuring signal power. Other techniques include re-encoding the data and comparing with the originally transmitted data for an indication of errors. It should further be understood that the power of the data signal itself may be measured and used as an indication of link quality.

The frame error information is provided to processor 78. Processor 78 in response to a frame error rate exceeding a predetermined threshold level over a certain number of frames, such as 5 frames, generates a power increase request message that is output to transmit modulator 84. Transmit modulator 84 modulates the power request message for transmission to the cell-site.

It should be understood that the system controller through the cell-site modules may solicit a power level measurement at the mobile units. Each mobile unit communicates its power level measurement to the system controller. In response thereto the system controller may adjust transmission power for the various cell-site modules for system optimization.

The previous description of the preferred embodiments are provided to enable any person skilled in the art to make or use the present invention. Various modifications to these embodiments will be readily apparent to those skilled in the art, and the generic principals defined herein may be applied to other embodiments without the use of the inventive faculty. Thus, the present invention is not intended to be limited to the embodiments shown herein, but is to be accorded the widest scope consistent with the principals and novel features disclosed herein.

I claim:

1. A first station transceiver having a receiver for receiving and demodulating a second station transmitted spread spectrum communication signal, and a transmitter for transmitting a first station spread spectrum communication signal to said second station, said transceiver having a power control system for controlling signal power of said first station spread spectrum communication signal about a predetermined power level as received at said second station, wherein said second station measures signal power of said first station spread spectrum communication signal as received at said second station, generates power adjustment commands according to variations in said measured signal power with respect to said predetermined power level and transmits said power adjustment commands in said second station spread spectrum communication signal, said power control system comprising:

control processor means coupled to said receiver for receiving said power adjustment commands and generating a corresponding closed loop power level control signal;

automatic gain control means coupled to said receiver for measuring signal power of said second station spread spectrum communication signal as received by said receiver, and providing a corresponding power measurement signal;

conversion means coupled to said receiver for determining signal power of said second station spread spectrum communication signal as received by said receiver and generating an open loop power level set signal with respect to predetermined level setting parameters;

comparator means for comparing said power measurement signal and said open loop power level signal, and providing a corresponding open loop power level control signal; and amplifier means for receiving said open loop and closed loop power level control signals, receiving and amplifying said first station spread spectrum communication signal at a gain determined by said open loop and closed loop power level control signals, and providing said amplified first station spread spectrum communication signal to said transmitter for transmission to said second station.

2. The transceiver of claim 1, wherein said receiver has an analog receiver portion and a digital receiver portion, said automatic gain control means coupled to said analog receiver portion for measuring wideband signal power of said received second station spread spectrum communication signal.

3. The transceiver of claim 2 wherein said digital receiver portion despreads said received second station spread spectrum communication signal and extracts therefrom said power adjustment commands and, wherein each power adjustment command affects a change in said closed loop power level control signal with said amplifier means responsive to each change in said closed loop power level control signal so as to provide a corresponding change in said gain.

4. The transceiver to claim 3 wherein each change in said gain of said amplifier means corresponds to a predetermined dB change in signal power of said first station spread spectrum communication signal.

5. The transceiver of claim 1 wherein an increase in measured second station spread spectrum communication signal power corresponds to an increase in said open loop power control level signal with said amplifier means responsive thereto for decreasing said gain, and a decrease in measured second station spread spectrum communication signal power corresponds to a decrease in said open loop power control level signal with said amplifier means responsive thereto for increasing said gain.

6. The power control system of claim 1 wherein said amplifier means comprises:
first variable gain amplification means for receiving said closed loop power level control signal and amplifying said first station spread spectrum communication signal at a first gain level determined by said closed loop power level control signal; and
second variable gain amplification means for receiving said open loop power level control signal and amplifying said first gain level amplified first station spread spectrum communication signal at a second gain level determined by said open loop power level control signal.

7. The power control system of claim 1 further comprising normalization means for receiving said second station spread spectrum communication signal and said open loop power level control signal, amplifying said second station spread spectrum communication signal at another gain level determined by said open loop power level control signal to provide a normalized second station spread spectrum communication signal to said automatic gain control means and said conversion means.

8. In a remote station transceiver having a receiver for receiving a base station transmitted spread spectrum communication signal, and a transmitter for transmitting to said base station a remote station generated spread spectrum communication signal, a power control circuit for controlling transmission signal power of said remote station spread spectrum communication signal, comprising: communication signal, comprising:
an automatic gain control circuit coupled to said receiver, said automatic gain control circuit receiving and performing an analog measurement of signal power of said base station spread spectrum communication signal as received by said receiver and generating a resultant first power signal;
a conversion circuit coupled to said receiver, said conversion circuit performing a digital measurement of signal power of said base station spread spectrum communication signal as received by said receiver and generating a resultant second power signal;
a comparison circuit coupled to said automatic gain control circuit and said conversion circuit, said comparison circuit differentially integrating said first and second power signals and generating a resultant a first control signal; and
an amplifier circuit coupled to said comparison circuit and said transmitter, said amplifier circuit receiving said first control signal, and receiving and amplifying said remote station spread spectrum communication signal at a gain determined by said first control signal.

9. The power control circuit of claim 8 wherein said amplifier circuit further receives an input of a second control signal and amplifies said remote station spread spectrum communication signal at an additional gain determined by said second control signal.

10. The power control circuit of claim 9 wherein said amplifier circuit comprises first and second variable gain amplifiers each having a signal input and output, and a control input, said second variable gain amplifier receiving at said second variable gain amplifier signal input said remote station spread spectrum communication signal and said second variable gain amplifier signal output coupled to said first variable gain amplifier signal input, said first and second variable gain amplifier control inputs for respectively receiving said first and second control signals.

11. The power control system of claim 10 further comprising an third variable gain amplifier having a signal input and output, and a control input, said third variable gain amplifier signal input coupled to said receiver and said third variable gain amplifier signal output coupled to said automatic gain control circuit and said conversion circuit, said third variable gain amplifier control input coupled to said comparison circuit, said third variable gain amplifier receiving said second station spread spectrum communication signal and said first control signal, and amplifying said second station spread spectrum communication signal at said gain determined by said first control signal to provide a normalized second station spread spectrum communication signal to said automatic gain control circuit and said conversion circuit.

12. The power control circuit of claim 9 wherein said power control circuit controls transmission signal power of said remote station spread spectrum communication signal about a predetermined power level as received at said base station with said base station measuring signal power of said remote station spread spectrum communication signal as received at said base station, generating power adjustment commands according to variations in said base station measured signal power of said remote station spread spectrum communication signal with respect to said predetermined power level and transmitting said power adjustment commands in said base station spread spectrum communication signal, said receiver demodulating said base station spread spectrum communication signal and said transceiver further having a control processor coupled to said receiver for receiving from said demodulated base station spread spectrum communication signal said power adjustment commands, said control processor accumulating values corresponding to said power adjustment commands with respect to a predetermined value, and generating said second control signal.

13. The power control system of claim 8 further comprising an additional amplifier circuit coupled between said receiver and said automatic gain control circuit and between said receiver and said conversion circuit, said additional amplifier circuit also coupled to said comparison circuit, said additional amplifier circuit receiving said second station spread spectrum communication signal and said first control signal, and amplifying said second station spread spectrum communication signal at said gain determined by said first control signal to provide a normalized second station spread spectrum communication signal to said automatic gain control circuit and said conversion circuit.

14. In a first station transceiver having a receiver for receiving a second station transmitted spread spectrum communication signal, and a transmitter for transmitting to said second station a first station generated spread spectrum communication signal, a method for controlling transmission signal power of said first station spread spectrum communication signal comprising the steps of:

performing an analog measurement of signal power of said base station spread spectrum communication signal as received by said receiver to generate a resultant first power signal;

performing a digital measurement of signal power of said base station spread spectrum communication signal as received by said receiver to generate a resultant second power signal;

differentially integrating said first and second power signals to generate a resultant first control signal; and amplifying said remote station spread spectrum communication signal at a gain determined by said first control signal.

15. The method of claim 14 further comprising the step of amplifying said remote station spread spectrum communication signal at an additional gain determined by a second control signal.

16. The method of claim 15 further comprising the step of amplifying said base station spread spectrum communication signal as received by said receiver at said determined by said first control signal to provide a normalized base station spread spectrum communication signal upon which said analog and digital signal power measurements are performed.

17. The method of claim 14 further comprising the step of amplifying said base station spread spectrum communication signal as received by said receiver at said determined by said first control signal to provide a normalized base station spread spectrum communication signal upon which said analog and digital signal power measurements are performed.

18. The method of claim 14 wherein said base station measures signal power of said remote station spread spectrum communication signal as received at said base station, generates power adjustment commands according to variations in base station measured signal power of said remote station spread spectrum communication signal with respect to a predetermined power level and transmits said power adjustment commands in said base station spread spectrum communication signal, and said receiver demodulates said base station spread spectrum communication signal and said transceiver further having a control processor coupled to said receiver for receiving from said demodulated base station spread spectrum communication signal, said method further comprising the steps of:

extracting said power adjustment commands from said demodulated base station spread spectrum communication signal; and generating said second control signal.

19. The method of claim 18 further comprising the step of accumulating values corresponding to said power adjustment commands with respect to a predetermined value from which said second control signal is generated.

* * * * *